(12) United States Patent
Kim

(10) Patent No.: US 6,322,124 B1
(45) Date of Patent: Nov. 27, 2001

(54) REINFORCEMENT STRUCTURE FOR COWL SIDE PORTION OF AUTOMOBILES

(75) Inventor: Sang-Up Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/628,161

(22) Filed: Jul. 28, 2000

(30) Foreign Application Priority Data

Dec. 31, 1999 (KR) .................................... 99-68312

(51) Int. Cl.$^7$ .................................... B62D 25/08
(52) U.S. Cl. ..................... 296/30; 296/192; 296/202; 296/188
(58) Field of Search ................. 296/29, 30, 192, 296/202, 203.03, 194, 188, 189

(56) References Cited

U.S. PATENT DOCUMENTS 4,550,948 * 11/1985 Hamada et al. .................... 296/30 X
5,042,872 * 8/1991 Yoshii .............................. 296/194 X
5,586,799 * 12/1996 Kanemitsu et al. ............. 296/202 X

* cited by examiner

Primary Examiner—Joseph D. Pape
(74) Attorney, Agent, or Firm—Christie, Parker & Hale, LLP

(57) ABSTRACT

The object of the present invention is to provide a reinforcement structure for a cowl side portion of automobiles. In this structure, the locking structure between the cowl side portion and two front pillars forms a plurality of independent cavities at the junction between the cowl side portion and each front pillar, thus improving the structural strength of the cowl side portion of the automobile body and effectively distributing impact to the parts in the case of an unexpected side collision or an unexpected front collision of an automobile. This structure also allows the door hinge reinforcing bracket to be welded to both the inside and outside pillar panels, thus improving the torsion strength of the two front pillars. The reinforcement structure consists of inside and outside pillar panels of each front pillar integrated with front and rear cowl panels of the cowl portion at the front junction of the pillar panels through a welding process. A cowl side extension panel integrates the rear cowl panel of the cowl portion with the inside pillar panels of the front pillar. A door hinge reinforcing bracket is integrated with the inside and outside pillar panels of the front pillar at its opposite ends while dividing a cavity formed between the two pillar panels.

2 Claims, 4 Drawing Sheets

REINFORCEMENT STRUCTURE FOR COWL SIDE PORTION OF AUTOMOBILES

BACKGROUND OF THE INVENTION

1. Field of the Invention

The present invention relates, in general, to a cowl side portion of automobiles and, more particularly, to a reinforcement structure for such a cowl side portion, the reinforcement structure being designed to change a locking structure between the cowl side portion and two front pillars, thus giving improved structural strength to a side portion of the automobile body and allowing the side portion of the body to effectively protect passengers in the passenger compartment from impact in the case of a side collision or a front collision of the automobile.

2. Description of the Prior Art

FIG. 1 is a perspective view of the body of an automobile. As shown in FIG. 1, the front portion of the automobile body comprises an engine compartment for seating an engine and a power transmission mechanism, with a hood 1 openably covering the engine compartment. A longitudinal front pillar 3 upwardly, rearwardly extends from around each of the left and right corners of the hood's rear portion and holds the side edge of a windshield. Two front fenders 5 are provided along the left and right side edges of the hood 1 and are mounted over the two front wheels 4. FIG. 2 shows the interior structure of the portion "P" of FIG. 1. As shown in the drawing, the two front pillars 3 are welded to opposite ends of a cowl portion 6 through a welding process, with the cowl portion 6 transversely extending in the automobile body to partition the passenger compartment from the engine compartment.

FIG. 3 shows the welded junction between the front pillar 3 and the cowl side portion 6. As shown in the drawing, each front pillar 3 comprises inside and outside pillar panels 3a and 3b, which are welded together with an outside door panel 7 into a single body with a cavity having a predetermined volume. In addition, a front cowl panel 6a of the cowl portion 6 is integrated with the front junction of the two pillar panels 3a and 3b of the front pillar 3. On the other hand, a rear cowl panel 6b of the cowl portion 6 is integrated with the inside pillar panels 3a of the front pillar 3 into a single body using a cowl side extension panel 8.

A door hinge reinforcing bracket 9 is mounted to the interior surface of the outside pillar panel 3b of the front pillar 3. In such a conventional structure, the bracket 9 reaches the inside pillar panel 3a of the front pillar 3, but undesirably is not welded to the panel 3a.

In order to weld the bracket 9 to the panel 3a inside the front pillar 3, the bracket must be extended and it is necessary to allow a welding gun G to reach the inside and outside portion of the panel 3a as shown by the phantom line of FIG. 3. However, the interior of the front pillar 3 is completely closed, and so it is impossible for the welding gun G to reach the inside portion of the panel 3a. Therefore, the bracket 9 is not welded to the panel 3a.

In the conventional automobile body with the cowl portion 6 being welded to the front pillars 3 as described above, it is impossible to firmly assemble the cowl portion 6 with the front pillars 3 or to effectively distribute impact to the parts in the case of an unexpected side collision or an unexpected front collision of the automobile. In addition, each front pillar 3 of the conventional structure is not provided with a separate member designed to connect the two panels 3a and 3b, and so each front pillar 3 merely has low torsion strength.

SUMMARY OF THE INVENTION

Accordingly, the present invention has been made keeping in mind the above problems occurring in the prior art, and an object of the present invention is to provide a reinforcement structure for a cowl side portion of automobiles, which is designed to change a locking structure between the cowl side portion and two front pillars so as to form a plurality of independent cavities at the junction between the cowl side portion and each front pillar, thus improving the structural strength of the cowl side portion of the automobile body and effectively distributing impact to the parts in the case of an unexpected side collision or an unexpected front collision of an automobile, and which is also designed to allow the door hinge reinforcing bracket to be welded to both the inside and outside pillar panels, thus improving the torsion strength of the two front pillars.

In order to accomplish the above object, the present invention provides a reinforcement structure for a cowl side portion of automobiles with a front pillar welded to a cowl portion, comprising: inside and outside pillar panels of each front pillar integrated with front and rear cowl panels of the cowl portion at the front junction of the pillar panels through a welding process; a cowl side extension panel integrating the rear cowl panel of the cowl portion with the inside pillar panels of the front pillar; and a door hinge reinforcing bracket integrated with the inside and outside pillar panels of the front pillar at its opposite ends while dividing a cavity formed between the pillar panels.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
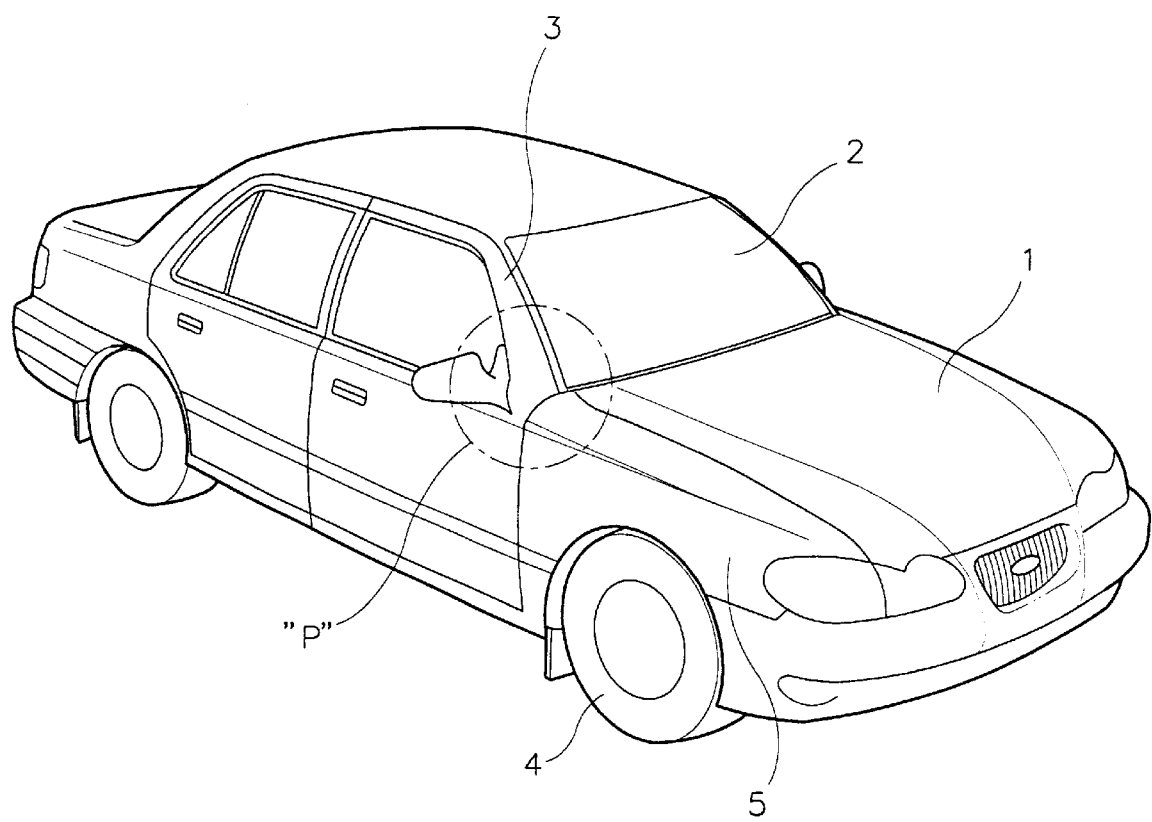
FIG. 1 is a perspective view of the body of an automobile.
Figure 2:
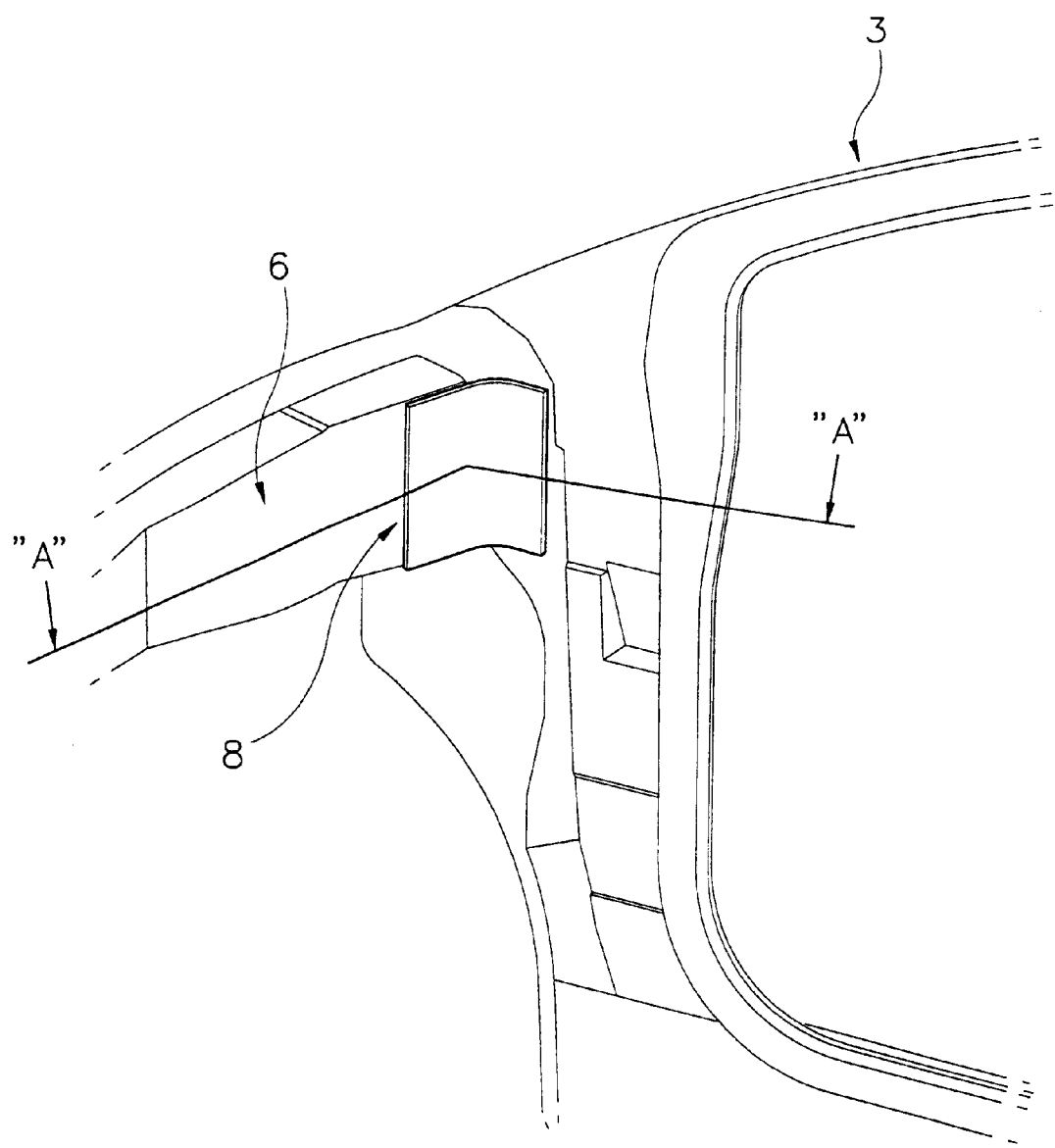
FIG. 2 is a perspective view, showing a part of a conventional locking structure between a cowl side portion and one front pillar of an automobile body.
Figure 3:
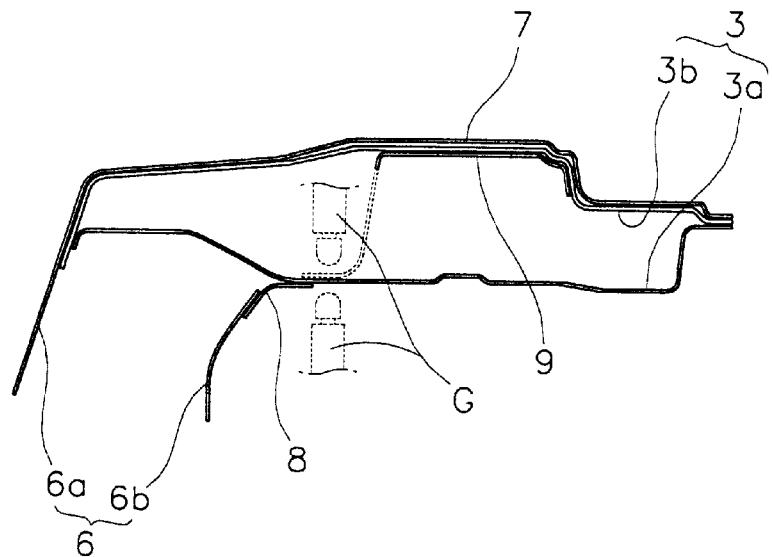
FIG. 3 is a plan sectional view taken along the line A—A of FIG. 2, showing the welded junction between the cowl side portion and the front pillar according to the prior art.
Figure 5:
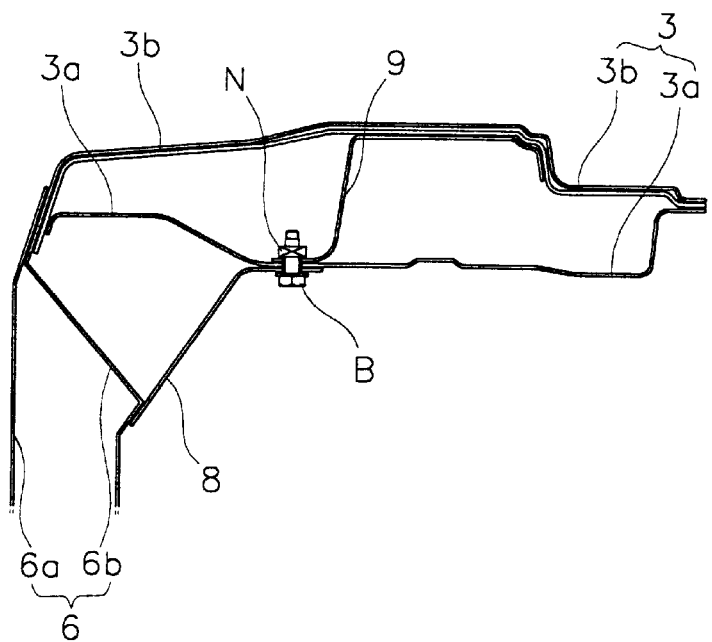
FIG. 5 is a plan sectional view taken along the line B—B of FIG. 4, showing the welded junction between the cowl side portion and the front pillar of this invention.
Figure 4:
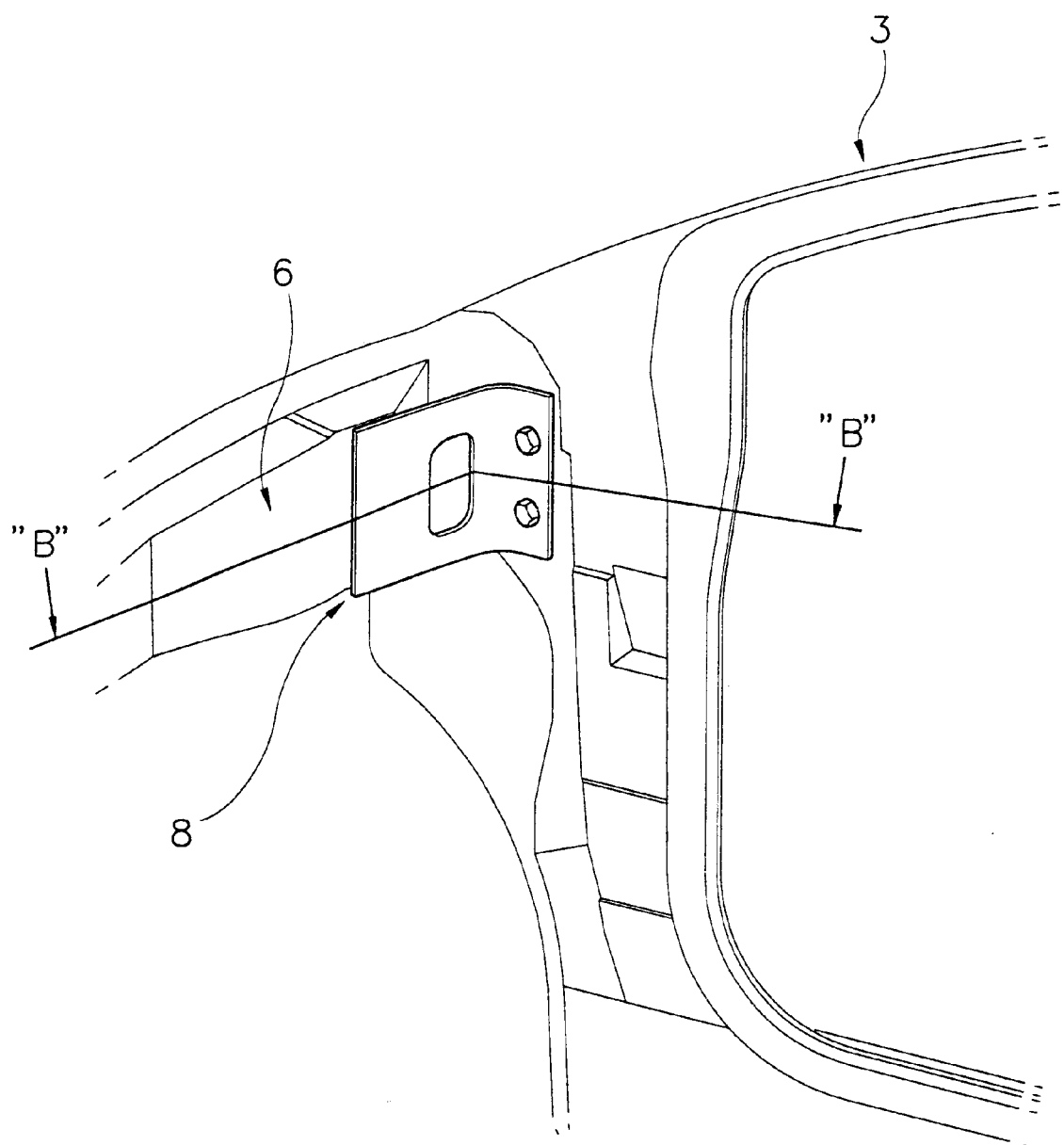
FIG. 4 is a perspective view, showing a part of a locking structure between a cowl side portion and one front pillar of an automobile body in accordance with the preferred embodiment of the present invention.

FIG. 4 is a perspective view, showing a part of a locking structure between a cowl side portion and one front pillar of an automobile body in accordance with the preferred embodiment of this invention. FIG. 5 is a plan sectional view taken along the line B—B of FIG. 4, showing the welded junction between the cowl side portion and the front pillar of this invention. In the reinforcement structure of this invention, most of the elements are common with those of the conventional structure of FIGS. 2 and 3. Those elements common to both the conventional structure and the structure of this invention will thus carry the same reference numerals.

As shown in the drawings, the structure of this invention is comprised as follows: Each front pillar 3 comprises inside and outside pillar panels 3a and 3b, which are welded together into a single body with a cavity having a predetermined volume. In addition, front and rear cowl panels 6a and 6b of the cowl portion 6 are integrated with the front junction of the two pillar panels 3a and 3b of the front pillar 3 through a welding process. In such a case, the rear cowl panel 6b of the cowl portion 6 is integrated with the inside pillar panels 3a of the front pillar 3 using a cowl side extension panel 8. A door hinge reinforcing bracket 9 is welded to the outside pillar panel 3b inside each front pillar 3 at one end thereof and extends to the inside pillar panel 3a of the front pillar 3, and is mounted to the inside pillar panel 3a using a locking means at the end thereof.

That is, in the above reinforcement structure, the above bracket 9 is welded to the outside pillar panel 3b of the front pillar 3 at the first end thereof and extends to the inside pillar panel 3a of the front pillar 3 at the second end thereof, and is mounted to the inside pillar panel 3a using a locking means, which consists of a nut N and a bolt B and is installed at the overlapped portion of the inside pillar panel 3a and the cowl side extension panel 8.

In order to accomplish the above structure, the inside pillar panel 3a, the cowl side extension panel 8 and the bracket 9 are provided with screw holes at corresponding positions for receiving the bolt B of the locking means. On the other hand, the nut N of the locking means is mounted to the bracket 9 through a welding process.

Therefore, when the front and rear cowl panels 6a and 6b of the cowl portion 6 are integrated with the front junction of the two pillar panels 3a and 3b of the front pillar 3 through a welding process, the integration strength between them in addition to the structural strength of the cowl side portion is desirably increased. Particularly, the cowl side extension panel 8, connecting the inside and outside pillar panels 3a and 3b of the front pillar 3 to each other, is bolted to the junction between the rear cowl panel 6b of the cowl portion 6 and the inside pillar panel 3b of the front pillar 3 along with the door hinge reinforcing bracket 9. Therefore, it is possible to increase the torsion strength of the front pillars 3.

The bracket 9, arranged to divide the cavity between the two pillar panels 3a and 3b of the front pillar 3, is somewhat easily assembled with both the inside pillar panel 3a and the cowl side extension panel 9 using the locking means. Therefore, the reinforcement structure of this invention solves the problem experienced in the conventional structure in that the completely closed interior of the front pillar 3 does not allow a welding gun to reach the inside and outside portion of the inside pillar panel 3a or to allow the bracket 9 to be installed between the two pillar panels 3a and 3b.

The welded structure between the front pillars 3 and the cowl portion 6 of this invention allows opposite ends of the cowl portion 6 to be firmly and stably held on the two front pillars 3. This structure thus effectively distributes impact, applied to the automobile body through the cowl portion 6 or the front pillars 3 in the case of an unexpected side collision or an unexpected front collision of the automobile, to its parts.

In addition, the door hinge reinforcing bracket 9 is arranged to divide the cavity between the two pillar panels 3a and 3b of the front pillar 3, and so the torsion strength of the front pillar 3 is desirably increased.

As described above, the present invention provides a reinforcement structure for a cowl side portion of automobiles. This reinforcement structure is designed to change a locking structure between the cowl side portion and two front pillars so as to improve the structural strength of the cowl side portion of an automobile body and to effectively distribute impact to the parts of the structure in case of a side collision or a front collision of an automobile. In addition, this reinforcement structure also allows a door hinge reinforcing bracket to be fixed to both the inside and outside pillar panels of each pillar panel, thus improving the torsion strength of the two front pillars.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reinforced automobile structure comprising:

inside and outside pillar panels of a front pillar integrated with front and rear cowl panels of a cowl portion at a front junction of the pillar panels through a welding process;

a cowl side extension panel integrating said rear cowl panel of the cowl portion with the inside pillar panel of the front pillar; and a door hinge reinforcing bracket integrated with the inside and outside pillar panels of the front pillar at its opposite ends while dividing a cavity formed between the pillar panels.

2. The structure according to claim 1, wherein said door hinge reinforcing bracket is integrated with both the inside panel of the pillar portion and the cowl side extension panel using a nut and a bolt.

* * * * *